United States Patent [19]

McCloskey

[11] 4,053,190

[45] Oct. 11, 1977

[54] SELF-ALIGNING BEARING WITH A SPLIT INNER MEMBER

[75] Inventor: Albert R. McCloskey, Fairfield, Conn.

[73] Assignee: The Heim Universal Corporation, Fairfield, Conn.

[21] Appl. No.: 615,624

[22] Filed: Sept. 22, 1975

Related U.S. Application Data

[62] Division of Ser. No. 589,201, June 23, 1975, Pat. No. 4,024,616.

[51] Int. Cl.² .............................................. F16C 23/08
[52] U.S. Cl. ........................................ 308/72; 308/238
[58] Field of Search ................................. 308/72, 238; 29/148.4 A, 149.5 B

[56] References Cited

U.S. PATENT DOCUMENTS

| 2,345,564 | 4/1944 | Allen | 308/72 |
| 3,339,988 | 9/1967 | Schultze | 308/72 X |

*Primary Examiner*—Robert R. Song
*Assistant Examiner*—Gene A. Church
*Attorney, Agent, or Firm*—James C. Wray

[57] ABSTRACT

A self-aligning bearing assembly comprising an outer member having a concave inner surface and an inner member carried within the outer member and having a convex outer surface generally complementary to the concave inner surface, said inner member being split and selectively and partially collapsible for insertion within said outer member.

15 Claims, 5 Drawing Figures ing may play a vital role in the various machine elements that might comprise a process line or the like. Accordingly, any malfunction of the spherical bearing will result in a disabling of the process line which could cause significant economic loss and possible damage to other apparatus or device with which the spherical bearing is associated.

SELF-ALIGNING BEARING WITH A SPLIT INNER MEMBER

This is a division of application Ser. No. 589,201, filed June 24, 1975, now U.S. Pat. No. 4,024,616.

BACKGROUND OF THE INVENTION

The present invention relates to self-aligning bearings, including spherical bearings, spherical rod end bearings and the like. More particularly, the present invention relates to self-aligning bearings having a split inner member which affords quick and inexpensive bearing assembly using simplistic tools and techniques. Further, the bearing, in accordance with the present invention, may be "adjusted" in the field without disassembly or significant "down time" of the machine or apparatus with which it is operatively associated.

The self-aligning form of bearing has found wide acceptance in industry and has been used in a multiplicity of applications and in a variety of environments. As with any type of mechanical element, a spherical bearing will tend to wear at its bearing surfaces over long periods of operation. This wear will generally manifest itself in a "loose" fit between the inner member and outer member. That is, as the bearing surfaces defined by the outer surface of the inner surface of the outer member wear, tolerance or gap between these two parts will increase. On many applications, the spherical bearing may play a vital role in the various machine elements that might comprise a process line or the like. Accordingly, any malfunction of the spherical bearing will result in a disabling of the process line which could cause significant economic loss and possible damage to other apparatus or device with which the spherical bearing is associated.

There have been attempts to provide a spherical bearing which can be readily "adjusted" in the field and these attempts have met with only limited success.

SUMMARY OF THE INVENTION

It is therefore the primary object of the present invention to provide a self-aligning bearing assembly comprising an outer member having a concave inner surface and an inner member being split to afford insertion of the inner member within the outer member and to provide a means to vary the tolerance between the inner and outer members.

It is another object of the present invention to provide a self-aligning bearing assembly wherein the inner member is provided with a central bore and the split or groove provided in the inner member is completely therethrough and angularly disposed to the central bore.

It is still another object of the present invention to provide a self-aligning bearing assembly wherein said connecting means comprises a nut and bolt assembly, the shank of said bolt disposed within said central hole of said collar or sleeve, a tapered collar disposed within said bore and said collar having a central hole therethrough, said nut threadably attached to said bolt to operatively connect said inner member to said associated element, the degree of tolerance variation of said inner member with respect to said outer member depending upon the torque applied to said nut.

It is a further object of the present invention to provide a self-aligning bearing assembly wherein said inner member is operatively connected to an associated element by a nut and a bolt assembly, the shank of said bolt disposed within a central opening with a tapered collar disposed within the central bore, said nut threadably attached to said bolt, the said head of said bolt and the nut effecting the tolerance varying force on said inner member through said tapered collar, the vectors of said force applied to said collar vary the tolerance uniformly such that its convex outer surface remains substantially spherical.

It is also a further object of the present invention to provide a self-aligning bearing assembly wherein said inner member is manufactured from a wide range of materials including suitable bearing metals, including steel, and plastics, including self-lubricating plastic materials.

It is yet another object of the present invention to provide a self-aligning bearing assembly having a split inner member which is elemental in design and inexpensive to manufacture.

It is a further object of the present invention to provide a self-aligning bearing assembly having a split inner member which can be manufactured using automated high volume techniques.

Still other objects, features and attendant advantages of the present invention will become apparent to those skilled in the art from a reading of the following detailed description of the preferred embodiments constructed in accordance therewith, taken in conjunction with the accompanying drawings wherein like numerals designate like parts in the several figures.

DESCRIPTION OF THE INVENTION

Figure 1:
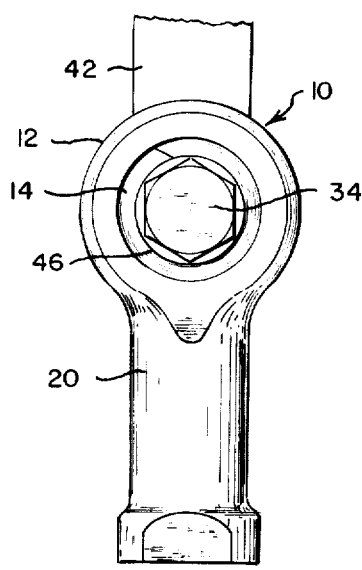
FIG. 1 is a front elevational view of a rod end spherical bearing in an assembled state and in accordance with the present invention.
Figure 2:
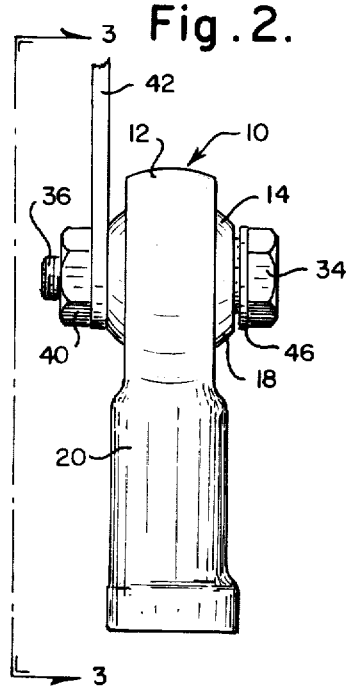
FIG. 2 is a side elevational view of the bearing of FIG. 1.
Figure 3:
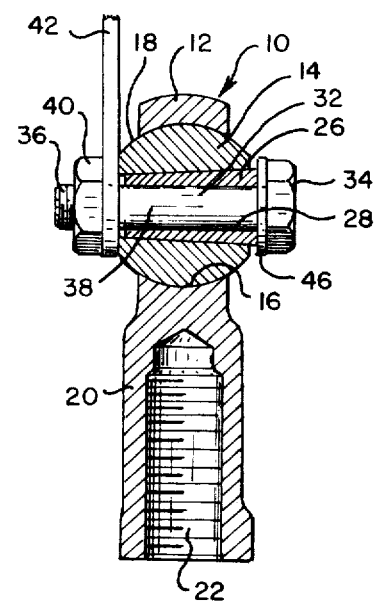
FIG. 3 is a side sectional view of the bearing of FIG. 2 taken along line 3—3.

Referring now to the figures and, in particular, FIGS. 1, 2 and 3, there is shown a rod end spherical bearing 10 in its assembled state.

The rod end spherical bearing 10 is configured generally the same as rod end spherical bearings found in the prior art. That is, the rod end spherical bearing 10 comprises an outer member 12 and an inner member 14. The outer member 12 is provided with a concave inner surface 16. The concave inner surface 16 of the outer member 12 is generally complementary to the convex outer surface 18 of the inner member 14.

The outer member 12 is of the female variety, the rod end extension 20 is internally bored and threaded at one end to provide an internal threaded surface 22. The internally threaded surface 22 may be threadably attached to an appropriate male threaded machine, element, apparatus, or the like (not shown). As such, the outer member 12 generally reflects the prior art forms of outer race members as applicable to self-aligning spherical bearings.

Figure 5:
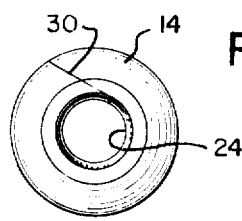
FIG. 5 is a side elevational view of the split inner member of the bearing of FIG. 1.

The thrust of the present invention is to be found in the provision of the inner member 14 and in particular to its various component parts. The inner member 14 is provided with a central bore or hole 24. The central hole or bore 24 may be tapered to accept and accommodate therein a similarly tapered collar, sleeve or bushing 26. The collar 26 may be provided with a central bore 28 therethrough whose longitudinally extending axis is generally coincident with a longitudinally extending axis of the central hole in the inner member. As before mentioned, the inner member 14 is provided with a convex outer surface 18 which, in the prior art, is generally a continuous body of revolution. However, in the present invention, it is contemplated that the inner member 14 is split at departure 30. The split at departure 30, as best seen in FIG. 5, may be disposed in a fashion such that it is generally tangential with the central hose or bore 24. The provision of a split inner member 14 provides certain unique and unexpected results in the present invention, both in terms of assembly and disassembly of the self-aligning bearing 10, as well as in the operation and maintenance of the bearing 10. These particular performance characteristics and capabilities will be discussed in detail below.

Referring again to FIGS. 1 through 5, it can be seen that the central bore 28 of the collar 26 is adapted to receive a bolt 32 therein and therethrough. The bolt 32 may be provided with a head 34 which may be manipulated or turned by a suitable tool or the like (not shown). The bolt 32 is provided with a threaded portion 36 and a shank portion 38, the shank portion 38 generally disposed within the central bore 28 of the collar 26. The threaded portion 36 of the bolt 32 is adapted to threadably receive a nut 40. The nut 40 when threaded upon the threaded portion 36 captures the machine element 42 which is operationally attached and pivots with the inner member 14. The machine element 42 is operatively connected with an associated machine, element, apparatus, or the like (not shown). A washer 46 may also be provided between the head 34 of the bolt 32 and the collar 26.

Figure 4:
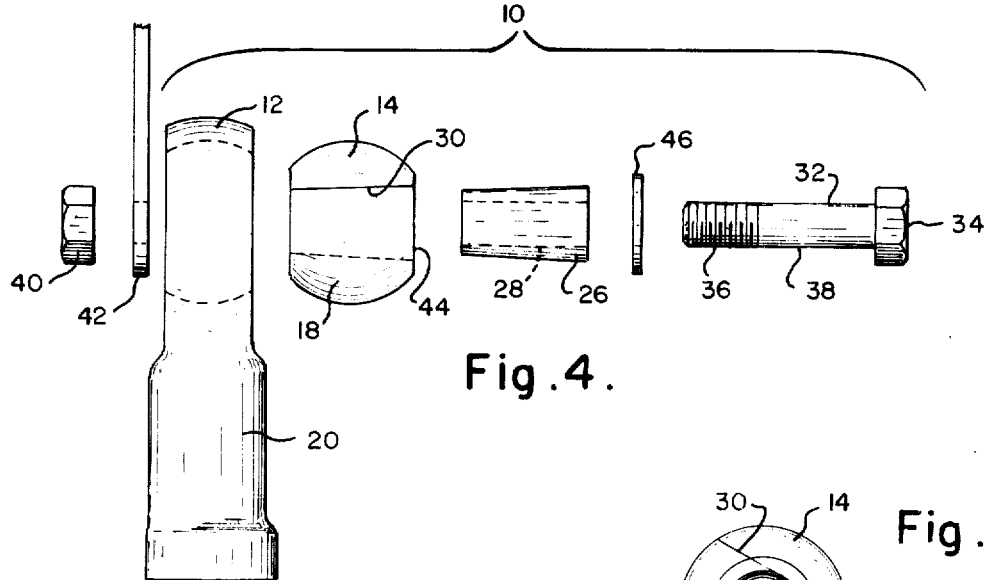
FIG. 4 is a side elevational view of the spherical bearing of FIG. 1 in a disassembled state and in accordance with the present invention.

The various elements, as above described, are shown in an "exploded" view in FIG. 4, wherein moving left to right the following parts or components of the rod end bearing 10 are shown:

The nut 40; machine element 42; outer member 12; inner member 14; collar 26; washer 46; and bolt 32. The exploded view as set forth in FIG. 4 is particularly useful in understanding the assembly (and disassembly) of the rod end bearing 10. The major problem confronted in the construction and manufacturing of rod end bearings is the operational mating of the inner and outer members. Many approaches in the prior art have been devised for this purpose and in the present invention this stage is achieved by the provision of the departure 30 in the inner member 14. More specifically, the departure 30 enables the inner member to be selectively and partially collapsed or reduced in its overall size and outer diameter to enable it to be inserted within the constructed area as defined by the concave inner surface 16 of the outer member 12. This selective and partial collapsing of the inner member 14 can be achieved by a tapered die (not shown) or other suitable technique. It is to be noted that the forces involved in this step are substantially reduced for the departure 30 allows the inner member 14 to act generally as a spring. This "springing" effect is reinforced by the provision of a tangential departure 30, that is the departure being disposed substantially tangential to the central bore 24. The exposed faces of the departure or split will act as a bearing surface during the reduction of the overall diameter of the inner member for insertion within the outer member 12. After the step of insertion is achieved, the springing effect will tend to drive the inner member back to its original shape. The materials from which the inner member 12 are to be manufactured and the application to which the rod end bearing 10 will be put will generally dictate whether or not a collar 26 will be needed to reinforce the inner member 24. That is, a collar 26 may be considered as an alternative within the context of the present invention and in that regard a bolt may be placed directly within the central bore or hole 24 of the inner member 14 without the provision of a collar therebetween.

However, when the application and material requirements indicate the use of a collar 26, the self-aligning bearing will be configured in the manner shown in FIGS. 1 through 4. It should be pointed out at this juncture of the description of the invention that the central bore 28 of the collar 26 would be substantially cylindrical in form while the outer surface of the collar would be provided with a slight taper. Similarly, the inner surface of the inner member 14 would also be formed in a generally complementary tapered fashion to accommodate the collar 26.

The collar 26 therefore performs a number of functions including reinforcing the inner member 14 when the inner member 14 is exposed to high operational load. The collar may also perform an additional function of varying the tolerance between the outer member 12 and the inner member 14 at their respective bearing surfaces 16 and 18. This latter function is effected by tightening the nut 40 on the threads 36 of the bolt 32. As the nut is further tightened, the head 34 of the bolt 32 will tend to drive the tapered collar 26 into the central hole 24 which in turn will expand the inner member 14 about the collar 26. This expansion of the inner member 14 will increase its outer diameter and reduce the bearing tolerance between the inner member 14 and outer member 12. The collar 26 may be driven into the central hole 24 to points where its end is flush with the lateral face 44 of the inner member. Thereafter, the bolt 32 would have to be removed to further manipulate the collar 26 or possibly as an alternative the washer 46 may be provided with an annular longitudinally extending rid (not shown) which might engage the lateral face of the collar 26.

Accordingly, it can be seen that the nut 40 and bolt 32 arrangement with its associated parts effect through the collar 26 a radially emanating force on the inner member 14 and this force will tend to uniformly maintain the convex outer surface 18 of said inner member 14. To enhance the bearing properties of the respective bearing surfaces as defined by the concave inner surface 16 and convex outer surface 18, these surfaces may be coated with suitable self-lubricated plastics such as Teflon (trademark of Du Pont). Additionally, the departure 30 as defined by the opposed faces thereof may also be coated with some form of a self-lubricated plastic material.

It can be therefore seen that there is above described a unique rod end bearing 10 having properties and characteristics that enable it to be manufactured using high volume automated techniques and adjusted in place using ordinary tools.

Obviously, the present invention is not limited to the specific details as herein described, but is capable of other modifications and changes without departing from the spirit and scope of the appended claims.

I claim:

1. A self-aligning bearing assembly comprising an outer member having a concave inner surface and an inner member operationally carried within said outer member and having a convex outer surface generally complementary to said concave inner surface, said inner member being split to provide a departure wherein said inner member is provided with a tapered hole therethrough, said departure being tangential to a central hole provided in said inner member.

2. A self-aligning bearing in accordance with claim 1 wherein said departure is formed through said inner member.

3. A self-aligning bearing in accordance with claim 1 wherein said hole in said inner member is central and tapered to accept to a complementary tapered collar therein.

4. A self-aligning bearing in accordance with claim 3 wherein said collar is provided with said central hole to accept an attaching means therethrough.

5. A self-aligning bearing in accordance with claim 4 wherein said attaching means includes a bolt, said bolt to have a nut threadably attached thereto, said bolt and said nut operationally attaching said inner member to a machine element.

6. A self-aligning bearing in accordance with claim 1 having a tapered collar within a centrally disposed complementary formed tapered hole through said inner member.

7. A self-aligning bearing assembly comprising an outer member having a concave inner surface and an inner member operationally carried within said outer member and having a convex outer surface generally complementary to said concave inner surface, said inner member being split to provide a departure wherein said inner member is provided with a tapered hole therethrough, wherein lateral faces of said departure are coated with a self-lubricated plastic material.

8. A self-aligning bearing in accordance with claim 7 wherein said inner member is provided with a central hole therethrough.

9. A self-aligning bearing assembly comprising an outer member having a concave inner surface and an inner member operationally carried within said outer member and having a convex outer surface generally complementary to said concave inner surface, said inner member being split at an angle to a radial direction to provide a departure, said departure being tangential to a central hole provided in said inner member.

10. A self-aligning bearing in accordance with claim 9 wherein said departure is formed through said inner member.

11. A self-aligning bearing in accordance with claim 9 wherein said central hole in said inner member is tapered to accept a complementary tapered collar therein.

12. A self-aligning bearing in accordance with claim 11 wherein said collar is provided with a central bore to accept an attaching means therethrough.

13. A self-aligning bearing in accordance with claim 12 wherein said attaching means includes a bolt, said bolt to have a nut threadably attached thereto, said bolt and said nut operationally attaching said inner member to a maching element.

14. A self-aligning bearing assembly comprising an outer member having a concave inner surface and an inner member operationally carried within said outer member and having a convex outer surface generally complementary to said concave inner surface, said inner member being split at an angle to a radial direction to provide a departure, wherein lateral faces of said departure are coated with a self-lubricated plastic material.

15. A self-aligning bearing in accordance with claim 14 wherein said inner member is provided with a central hole therethrough.

* * * * *